Patented Oct. 2, 1934

1,975,611

UNITED STATES PATENT OFFICE 1,975,611

AZO DYE

Mordecai Mendoza, West Didsbury, England, assignor to Imperial Chemical Industries Limited, a corporation of Great Britain No Drawing. Application June 22, 1932, Serial No. 618,706. In Great Britain July 6, 1931

4 Claims. (Cl. 260—88)

The present invention relates to azo dyes and more particularly refers to azo dyes especially adapted for dyeing wool and silk in shades fast to washing, light, milling, and stoving.

It was formerly very difficult to obtain an azo dye which would impart fast brown shades to silk and wool, there being almost none available. As a result it was necessary to use mixtures of dyes of other colors which were more easily obtained chemically.

It is an object of the present invention to produce acid dyes which impart fast shades, particularly browns, to wool and silk. Additional objects will appear hereinafter.

These objects are attained by the present invention wherein a diazotized alpha naphthylamine having substituted thereon a sulfonic acid group is coupled with alpha naphthylamine having substituted thereon a hydroxyl group.

The invention will be more completely understood by reference to the following example, in which the parts are given by weight:

Example 24.5 parts of the sodium salt of 1-naphthylamine-2-sulfonic acid were dissolved in 400 parts of water at 75° C. The solution was cooled to below 10° C. by the addition of 300 parts of ice, and diazotization was effected at this temperature by adding 70 parts of a 10% solution of sodium nitrite followed by 30 parts of 36% hydrochloric acid.

The diazo suspension so obtained was added to a solution of 15.9 parts of 1-5-aminonaphthol in 10 parts of 36% hydrochloric acid and 400 parts of water at about 10° C. Sufficient sodium acetate was added to the mixture to neutralize the mineral acidity and the coupling which proceeds was completed in the course of about 12 hours. Sodium carbonate was then added to make the solution alkaline to test paper and the dyestuff was finally isolated by the addition of common salt.

When dry it was a dark brown powder. When dyed on wool from an acid bath it gave full brown shades of good fastness to washing, light, milling and stoving.

In the above example 1-naphthylamine-2-sulfonic acid was diazotized and coupled with 1-5-aminonaphthol in an acid solution. However, the process of the present invention is not limited to alpha naphthylamines having the sulfonic acid group and the hydroxyl group substituted in the 2 and 5 positions, respectively. It may be applied to alpha naphthylamines wherein these substituted groups occupy other positions on the naphthalene nucleus; no appreciable change taking place in the resulting dye. Since the sulfonic acid group and the hydroxyl group may be substituted more easily in some positions than in others, it is to be expected that the more common substituted alpha naphthylamines will be used in the process herein described, although this is by no means necessary.

Coupling may take place in either an acid or an alkaline solution; a slightly bluer shade being imparted to wool when an alkaline solution is used. Since coupling would ordinarily take place in the 4, 6, or 7 position, depending on whether an acid or alkaline solution is used, it is to be expected that in certain cases where one of these positions is occupied by the substituted group it would be advisable to use a medium which would permit coupling to readily take place at one of the unoccupied positions. Ordinarily an acid or an alkaline medium may be used at will but, in the special cases just mentioned, where the alpha naphthylamine already has a group substituted in the position at which coupling would ordinarily be expected to take place, namely, the 4, 6, or 7 position, it is advisable to select the medium which would allow coupling to take place at an unoccupied position. This is well known to one skilled in the art so no difficulty should be encountered in carrying out the process of the present invention as previously described.

The azo dyes produced by the present invention are exceptionally well adapted for dyeing silk and wool and impart thereto beautiful shades having excellent fastness to washing, light, milling, and stoving.

As many apparently widely different embodiments of this invention may be made without departing from the spirit and scope thereof, it is to be understood that I do not limit myself to the specific embodiments thereof except as defined in the appended claims.

I claim:

1. A process for producing an azo dye which comprises coupling diazotized 1-naphthylamine- 2-sulfonic acid with 1-5-aminonaphthol.
2. An azo dye having the following formula:
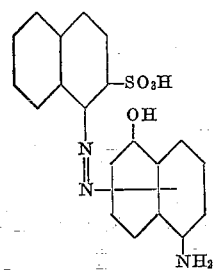
3. An azo dye having the following probable formula:
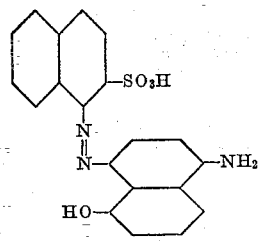
4. An azo dye having the following probable formula:
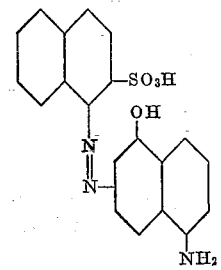
MORDECAI MENDOZA.